United States Patent [19]

Glass

[11] 4,115,608

[45] Sep. 19, 1978

[54] ORNAMENTAL SUNBURST HUB

[76] Inventor: Carl R. Glass, 1036 Partin Dr., Kissimmee, Fla. 32741

[21] Appl. No.: 853,915

[22] Filed: Nov. 22, 1977

[51] Int. Cl.[2] .................... B32B 3/02; 403 174;178;218

[52] U.S. Cl. ........................................... 428/65; 46/29; 403/174; 403/218; 428/66; 428/131; 428/542

[58] Field of Search ........................ 46/29; 156/60, 63; 220/20; 206/533, 538; 428/7, 8, 10, 12, 33, 45, 52, 53, 64, 65, 66, 131, 157, 192, 542

[56] References Cited

U.S. PATENT DOCUMENTS

| | | | |
|---|---|---|---|
| 1,192,039 | 7/1916 | Converse | 46/29 X |
| 2,140,874 | 12/1938 | Juelson | 15/369 |
| 2,228,691 | 1/1941 | Crosser | 428/11 X |
| 2,243,764 | 5/1941 | Miles, Jr. | 428/11 X |
| 2,410,874 | 11/1946 | Greenberg et al. | 46/29 |
| 2,722,772 | 11/1955 | Steanes | 46/29 |
| 2,909,867 | 10/1959 | Hobson | 403/174 X |
| 2,949,323 | 8/1960 | Moorhead | 211/175 |
| 3,132,652 | 5/1964 | Gazdik | 220/20 X |
| 3,552,056 | 1/1971 | Meates | 403/174 X |
| 3,896,247 | 7/1975 | Descleve et al. | 428/65 |
| 4,027,057 | 5/1977 | Grumbeck | 428/32 |

*Primary Examiner*—Henry F. Epstein

*Attorney, Agent, or Firm*—Sughrue, Rothwell, Mion, Zinn and Macpeak

[57] ABSTRACT

A hub is employed in forming an ornamental sunburst from a plurality of spokes. The hub includes an annular base plate and an outer hub having a tubular rim and an outer wall. Radially spaced wedge members on the interior surface of the outer wall define spaces for the spokes, and the base plate is engaged over the spokes and wedge members.

1 Claim, 4 Drawing Figures

ORNAMENTAL SUNBURST HUB

BACKGROUND OF THE INVENTION

1. Field of the Invention

This invention pertains to a device employed in the forming of decorative sunburst displays.

2. Statement of the Prior Art

Sunburst items have heretofore been proposed as have the demountable hubs employed in other environments of use. Prior patents in these areas include the following:

| Patentee | U.S. Pat. No. | Date |
|---|---|---|
| A. D. Converse | 1,192,039 | July 25, 1916 |
| H. Greenberg et al | 2,410,874 | Nov. 12, 1946 |
| W. B. Miles, Jr. | 2,243,764 | May 27, 1941 |
| L. D. Moorhead | 2,949,323 | Aug. 16, 1960 |
| Grumbeck | 4,027,057 | May 31, 1977 |

SUMMARY OF THE INVENTION

A principle objective of the present invention resides in the provision of a demountable, molded hub assembly for use in the formation of an ornamental sunburst item. These sunbursts are used, typically, to decorate walls or other open areas. The present invention makes possible the sale and transportation of these items in disassembled condition, with ease and speed of assembly at the site of use.

The improvements hereof eliminate the need for welding or other complex assembly procedures, and provide a sunburst saleable in kit form and adopted for assembly with simple, readily available tools.

The hub hereof provides for a correct and uniform spacing and orientation of the spokes, and for secure mounting of the same.

Other and further objects and advantages of the invention will become apparent to those skilled in the art from a consideration of the following specification when read in conjunction with the annexed drawing.

DESCRIPTION OF THE PREFERRED EMBODIMENT

Figure 1:
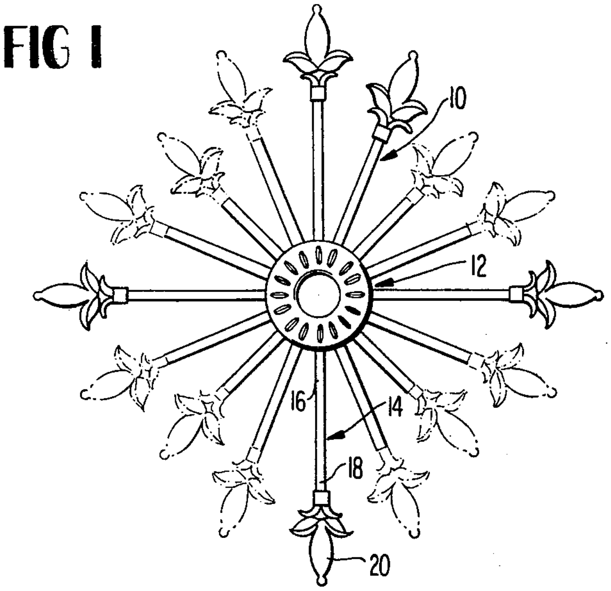
FIG. 1 is a front elevational view of a sunburst with a hub of this invention.
Figure 2:
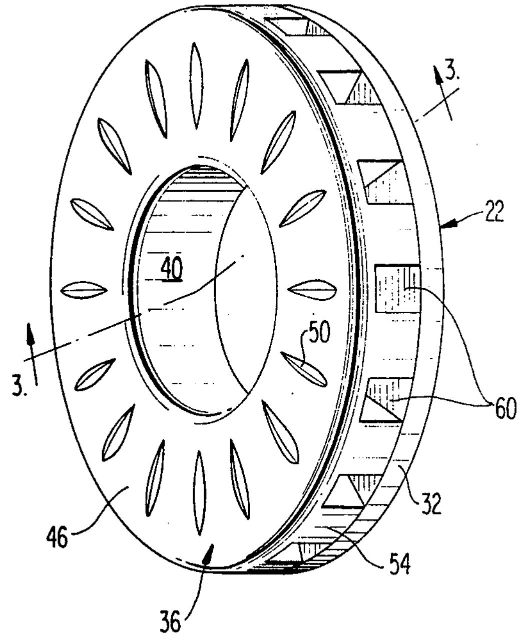
FIG. 2 is an enlarged, perspective view of the hub per se.
Figure 3:
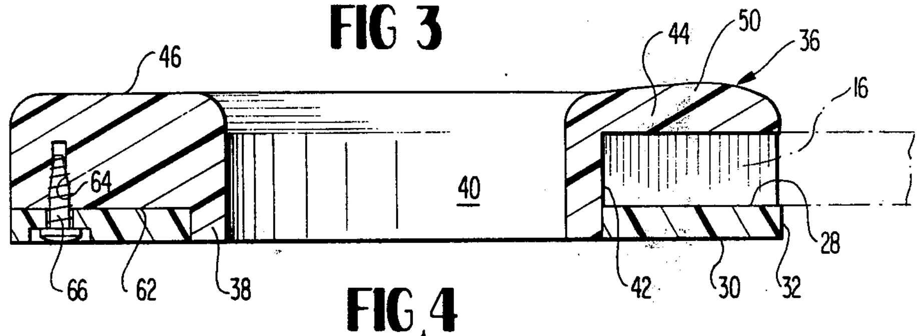
FIG. 3 is a further enlarged, detail cross section of the hub on line 3—3 of FIG. 2, looking in the direction of the arrows.
Figure 4:
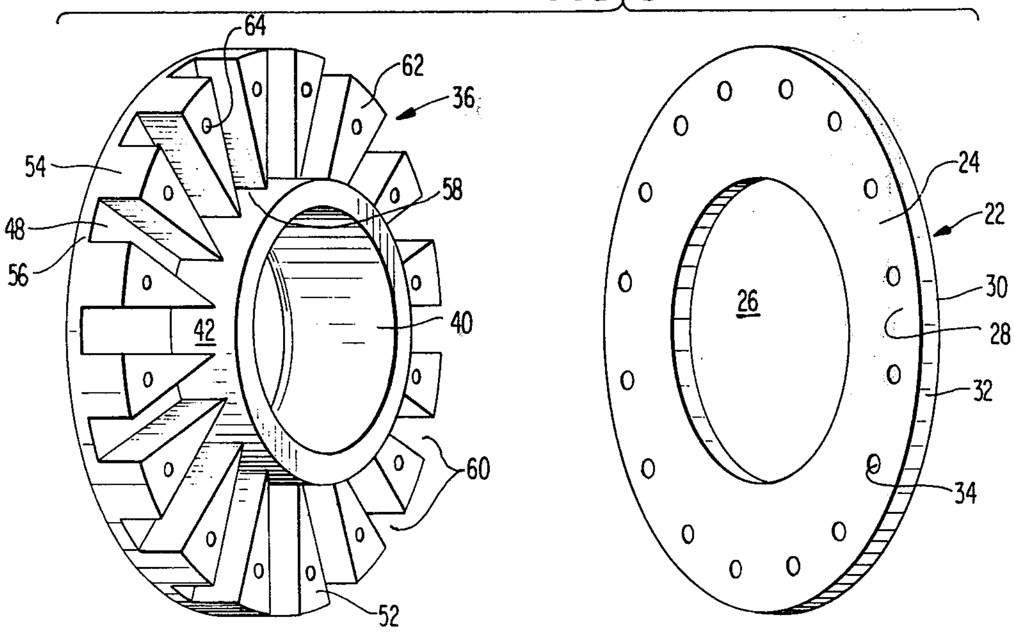
FIG. 4 is a disassembled perspective view of the hub.

Referring to the drawing in more detail, a typical sunburst assembled in accordance herewith is shown in FIG. 1, and designated by general reference character 10. The sunburst 10 includes a hub 12 hereof, and a plurality of substantially rectangular spokes 14 each of which includes a proximal end section 16 and a distal end section 18. Mounted on distal end sections 18 are decorative spear points 20, or the like.

The hub 12 comprises an annular base plate 22 including a flat main body portion 24 with a central opening 26 therein. The body portion 24 has opposite inner and outer faces 28, 30 and a peripheral edge 32. At radially spaced intervals, a series of countersunk apertures 34 are formed in the body portion.

The hub further includes an outer hub member 36. The outer hub member comprises a central, substantially tubular rim 38 having a central wall 40 and an outer rim wall 42. Projecting integrally outward from the rim 38 is an outer hub member outer wall 44. The outer wall 44 includes an exposed surface 46 and an opposite interior surface 48.

A series of decorative projections 50 are optionally provided on the exposed surface 46.

The interior surface of the outer wall has positioned thereon a plurality of radially arranged, spaced apart wedge member 52. Each of the wedge members has an enlarged, rounded outer end 54 which is coincident with the outer edge 56 of the outer wall, and a pointed end 58 which abuts and is integral with the rim inner wall 42. The wedge members thus define a series of radial spaces 60 which frictionally engage the proximal end sections 16 of the spokes when inserted therein.

The wedge members have top walls 62 spaced inwardly from the outer rim wall a distance substantially equal to the depth of the base plate. Formed in the wedge members, and opening on the top walls thereof, are screw openings 64. With the spoke ends in place in the spaces, the base plate 22 is fitted about the rim 38 against the top walls of the wedge members. The apertures 34 are aligned with the openings 64, and screws 66 are employed to clampingly engage the plate in place.

I claim:

1. An ornamental sunburst hub for forming a plurality of substantially rectangular, elongated spoke elements, with distal and proximal ends, and with molded spear points on their distal ends, into an ornamental sunburst, the hub comprising:

an annular inner base plate having a central opening and a peripheral edge, the base plate having a series of radially arranged, spaced apart, countersunk aperatures formed therein and being of selected depth;

an outer hub member comprising a central tubular rim and an outer wall;

said rim having an outside wall, and an inner rim wall;

the outer hub member having opposite exposed and interior surfaces and having a peripheral wall;

said exposed surface of said outer hub member having a series of decorative projections thereon;

the interior surface of the outer hub member having a plurality of radially arranged, spaced part wedge members with enlarged, rounded outer ends coincident with the peripheral wall, and having inner, pointed ends abutting and affixed integrally to the outside wall of the rim;

said wedge members defining spaces therebetween to frictionally engage the proximal ends of the spoke elements;

the wedge members having top walls spaced inwardly from the top rim wall a distance substantially equal to the depth of the base plate;

the wedge members having openings therein, and the base plate being engaged over the rim and against the wedge members with the aperatures thereof aligned with the wedge member openings; and changeable fasteners extended through said aperatures and into said openings to clampingly engage the base plate in place.

* * * * *